United States Patent [19]

Oland

[11] 4,004,093
[45] Jan. 18, 1977

[54] TRUNCATED SCHMIDT OPTICAL SYSTEMS FOR PROJECTING COLOR TELEVISION PICTURES

[75] Inventor: Bradley H. Oland, Oakland, Calif.

[73] Assignee: Tinsley Laboratories, Inc., Berkeley, Calif.

[22] Filed: Dec. 12, 1975

[21] Appl. No.: 640,177

[52] U.S. Cl. .................................. 358/60; 358/239
[51] Int. Cl.² ...................... H04N 5/74; H04N 9/31
[58] Field of Search .......... 178/7.88; 350/167, 213; 353/30, 31; 358/60

[56] References Cited

UNITED STATES PATENTS

| | | | |
|---|---|---|---|
| 1,124,253 | 1/1915 | Audibert | 350/213 |
| 2,999,126 | 9/1961 | Harries et al. | 178/7.88 |

*Primary Examiner*—Robert L. Griffin
*Assistant Examiner*—Mitchell Saffian
*Attorney, Agent, or Firm*—Thomas Schneck, Jr.

[57] ABSTRACT

A plurality of Schmidt optical systems is clustered together by truncating mutually adjacent edges of mirrors and correcting lenses which comprise individual Schmidt systems. By clustering individual systems together, keystone distortion is minimized.

8 Claims, 7 Drawing Figures

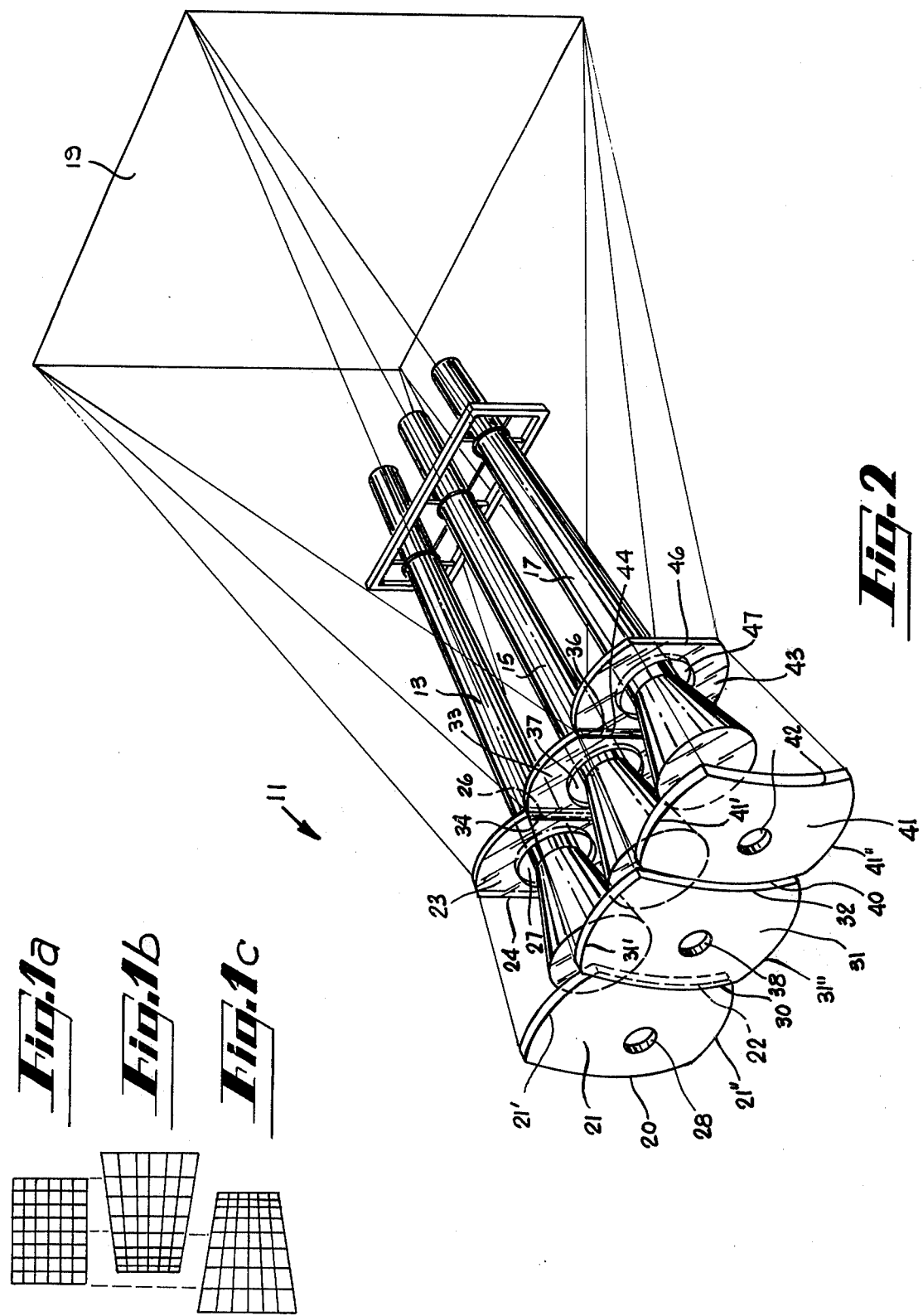

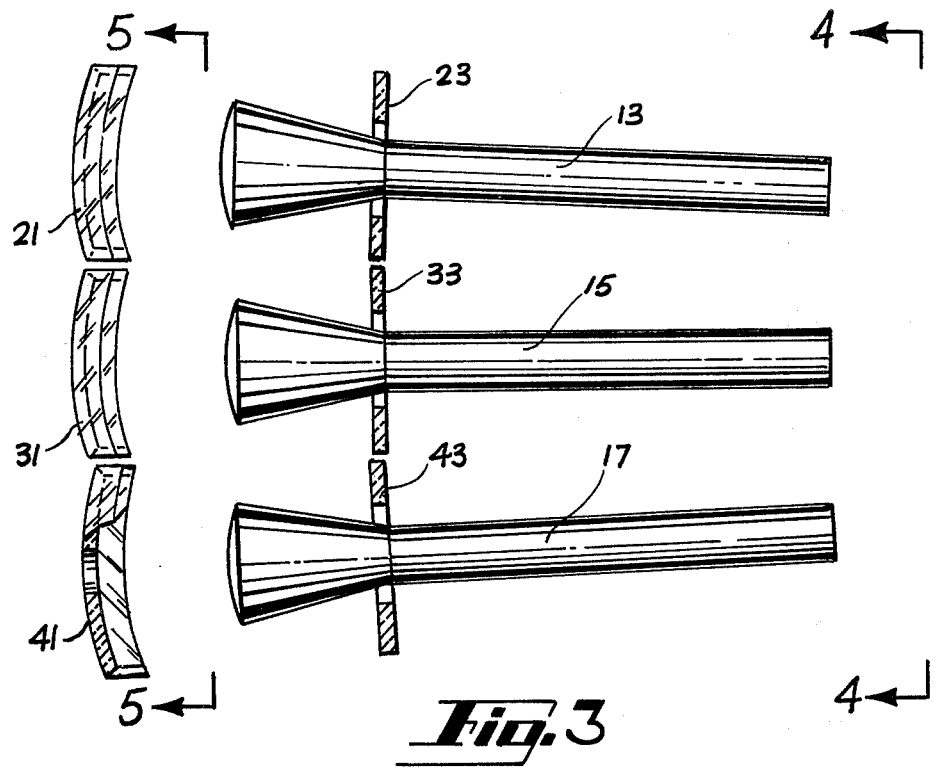
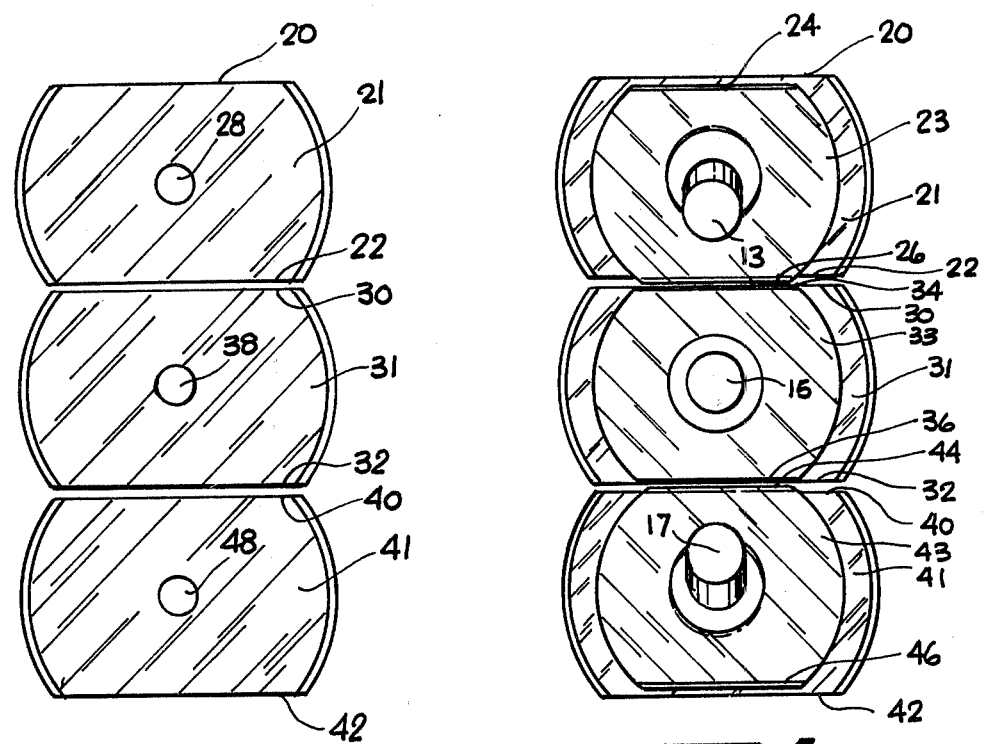

TRUNCATED SCHMIDT OPTICAL SYSTEMS FOR PROJECTING COLOR TELEVISION PICTURES

BACKGROUND OF THE INVENTION a. Field of the Invention

This invention relates to color television projection systems and more particularly to a compact Schmidt type projection system.

b. Prior Art

Schmidt type optical systems have previously been used in projecting images from cathode ray tubes and the like. The following U.S. Pat. Nos. each show single Schmidt type systems: 2,415,211; 2,415,311; 2,459,637; 3,600,628. The first of the aforementioned patents is typical of a Schmidt optical system. The system receives light from a cathode ray tube which projects the image therefrom in a direction behind the tube. A curved mirror is disposed in front of the face of the tube to reflect light rearwardly, behind the tube, toward a screen. Interposed between the screen and the curved mirror is a corrector lens which serves to reduce distortion introduced by the curved mirror. The curved mirror and the corrector lens are usually thought of as the components of the Schmidt optical system and these components generally have circular perimeters.

Schmidt type systems have been used in the prior art to project color television pictures. For example, see U.S. Pat. Nos. 3,839,599 and 3,115,544. In the last aforementioned patent, three Schmidt optical systems are placed side by side to receive signals from a color television receiver, which signals contain information indicative of the primary color to be displayed by each of three cathode ray tubes. The primary colors are each projected by a Schmidt optical system onto a screen. However, one of the problems which occurs is one of keystone distortion which arises because two of the three projection systems have axes which form oblique angles with the plane of the screen. This oblique incidence of two of the three images causes variations in the lateral magnification for different portions of the same image when viewed on the screen. Furthermore, this distortion produces varying degrees of misregistration between the different colors of the same image with the result that the image appears fuzzy or slightly blurred, i.e., overall resolution is reduced. Furthermore, keystone distortion causes television pictures to be asymmetrically bright, with more illumination on one side than the other. When three Schmidt type systems are used, two of the three primary colors have been asymmetrically bright.

Previously, Marley, in the aforementioned U.S. Pat. No. 3,115,544, taught an electronic means for eliminating keystone distortion arising from oblique incidence of images onto the screen.

It is an object of the invention to provide a compact color television projection system of a type which minimizes image misregistration and keystone distortion by optical means.

SUMMARY OF THE INVENTION

The above object has been achieved with a compact color television projection system which includes three individual Schmidt optical systems adjacently clustered which may be formed into a single unitary system. The three systems are intended to project the three primary colors which make up a composite color television picture and hence each system is adapted to receive the same television image, but in a different color and project it toward a screen for registration of the three primary colors and formation of a composite color image.

Each Schmidt optical system comprises a spherical mirror positioned for receiving an image from a respective, primary color, cathode ray tube and projecting the image toward a screen for common registration of primary color images. A corrector lens is spaced between the curved mirror and the screen and has a shape which corrects the spherical aberration introduced by the spherical mirror.

In order to cluster three adjacent Schmidt optical systems together, each adjacent curved mirror and each adjacent corrector lens is generally circular but having pairs of opposed chords truncating both the mirrors and the lens bodies such that the mirrors and lenses have parallel, linear edges which permit compact clustering of adjacent Schmidt optical systems.

By providing such compact clustering, keystone distortion may be dramatically reduced since the cathode ray tubes for each primary color project images which arrive almost orthogonally to the screen. For the same reason, complete registration of primary color images, and hence overall resolution, is enhanced.

BRIEF DESCRIPTION OF THE DRAWINGS

FIG. 1a illustrates a screen image without keystone distortion of a rectangular grid.

FIG. 1b illustrates a screen image with keystone distortion of a rectangular grid.

FIG. 1c illustrates a screen image with keystone distortion of a rectangular grid.

FIG. 2 is a perspective view of the apparatus of the present invention.

FIG. 3 is a top view of the apparatus of FIG. 2.

FIG. 4 is an end view of the apparatus of FIG. 3 taken along the lines 3—3.

FIG. 5 is a side view of the apparatus of FIG. 3 taken along the lines 4—4.

DESCRIPTION OF THE PREFERRED EMBODIMENT

FIG. 1a shows the projection of the image of a rectangular grid without keystone distortion. The grid is characterized by regularity of the rectangular element at left and right edges of the grid. FIGS. 1b and 1c illustrate the projected image of the same rectangular grid, with keystone distortion. Note that the entire image, as well as rectangular blocks within the image have tended to become trapazoidal, with a greater degree of distortion at the left and right edges and less distortion at the center of the grid. The distortion illustrated in FIG. 1b would come from a projection system which is projecting at an oblique angle with respect to a screen. The image of FIG. 1c would come from a projection system which is projecting at an equal but opposite oblique angle with respect to the system which is projecting in FIG. 1b. If FIGS. 1a, 1b and 1c represent three side by side Schmidt optical projection systems it can be seen that a misregistration of images will occur when the three systems are attempting to project the same image. If each image is in a different primary color, it will be seen that there will be asymmetrical brightness differences with respect to the colors projected by the systems used to project the images in FIGS. 1b and 1c. Since these two systems are projecting different colors, a bar-like pattern may be visible on the screen, due to differences in brightness of the image.

The perspective view of FIG. 2 shows a compact Schmidt optical system 11 of the present invention for projecting color television pictures from cathode ray tubes 13, 15, 17 onto screen 19, minimizing keystone distortion. This is accomplished by a plurality of individual Schmidt optical systems which are adjacently clustered, as shown in the figure, with small oblique projection angles for left and right systems. A first or left Schmidt optical system includes a curved spherical mirror 21 positioned for receiving an image from cathode ray tube 13 and projecting the image rearwardly towards screen 19. A corrector lens 23, mounted in a frame, not shown, is spaced between mirror 21 and screen 19. The corrector lens is shaped to eliminate spherical aberration, most of which is introduced by spherical mirror 21. The general shape for Schmidt mirrors and corrector lenses is known. For example, see U.S. Pat. Nos. 2,415,211 or 3,600,628. Mirror 21 has opposed parallel edges 20,22 which are chords truncating the generally circular shape of mirror 21 indicated by the lines 21' and 21''.

Similarly, the corrector lens 23 has a generally circular shape but with opposed chords truncating the lens and forming parallel opposed edges 24, 26. Further, lens 23 has a circular aperture 27 defined in the middle thereof for allowing the cathode ray tube 13 to extend through the corrector lens 23. A similar hole 28 in mirror 21 permits cooling of the apparatus when it is placed in a closed cabinet.

A second or central Schmidt optical system includes the curved spherical mirror 31 which is generally curved for projecting an image received from the cathode ray tube 15 in a rearwardly direction towards screen 19 behind tube 15. The mirror 31 has a generally circular shape which is indicated by lines 31' and 31'' and has opposed edges 31, 32 which are chords of truncation of the mirror 31.

The second Schmidt optical system further includes a corrector lens 33 for correcting spherical aberration in the image projected from the cathode ray tube 15 which is introduced by spherical mirror 31. The corrector lens is generally circular in perimeter but has opposed chords 34, 36 truncating the lens and forming edges which are substantially parallel to the edges of corrector lens 23 of the first optical system.

The truncated edges of corresponding portions of the first and second Schmidt system are generally parallel and adjacent and may be spaced closely together. A barrier, not shown, is extended from edges 26, 34 to the abutting edges 22, 30 of adjacent mirrors 21, 31 for the prevention of interference between images from the respective cathode ray tubes 13, 15.

Similarly, a third or right Schmidt optical system is adjacent the second Schmidt system. The third system includes a curved spherical mirror 41 having a generally circular perimeter as indicated by the lines 41', 41''. Chords 40, 42 truncate mirror 41, thereby forming edges which are spaced apart on opposed sides of mirror 41, generally parallel to the edges of chords 30, 32 and 20, 22 of the first and second mirrors 21, 31 respectively. Chords 40, 42 permit the clustering of mirror 41 adjacent to mirrors 31 and 21.

The third Schmidt optical system includes a corrector lens 43 spaced between the curved mirror 41 and the screen 19 for receiving the image projected from mirror 41 from cathode ray tube 17 and reducing spherical aberration of the image as the image is projected rearwardly from mirror 41 to the screen 19. The corrector lens 43 has a generally circular perimeter with chords 44, 46 truncating the lens body. The chords 44, 46 are spaced apart and parallel to each other and generally parallel to the chords 34, 36 and 24, 26 of the second and first corrector lenses 33 and 23 respectively. The chords of truncation once again permit clustering of adjacent edges such as edges 36 and 44 thereby allowing a compact placement of corrector mirrors 33 and 43. A circular aperture 47 defined in the corrector lens 43 permits the cathode ray tube 17 to extend therethrough, just as aperture 37 in lens 33 permits tube 15 to extend therethrough.

Each of the chords of truncation 20, 22; 30, 32; 40, 42; in the curved mirrors are parallel chords and each of the chords of truncation 24, 26; 34, 36; 44, 46; in lenses 23, 33, 43 respectively, are parallel chords, which cut respective lenses and mirrors in parallel lines. The chords of truncation are selected such that maximum area of the circular body is preserved while minimizing width. It is known that a television picture has a height to width ratio of approximately 3 to 4. The television picture height or width should be aligned with the chords of truncation so that brightness is maximized. Three separate cathode ray tubes, one for each primary color, are used in projection of color television pictures to maximize the brightness on screen 19.

If a circle of radius R has a chord of truncation perpendicularly truncating said radius by an amount $\Delta R$, the area of the circle is reduced by a known fraction. For example, the table below, Table I, indicates the fraction area reduction for a chord which orthogonally truncates a radius R by amount $\Delta R$.

TABLE I

| $\Delta R$ (fraction of R) | Area Ratio (fraction of complete area) |
| --- | --- |
| .05 | .0065 |
| .10 | .019 |
| .15 | .035 |
| .20 | .053 |
| .25 | .073 |
| .30 | .094 |
| .35 | .118 |
| .40 | .141 |
| .45 | .168 |
| .50 | .195 |
| .55 | .225 |
| .60 | .253 |
| .65 | .282 |

From Table I above it can be seen that a $\Delta R$ of .25 unit radius will only reduce the area of a circle by 7.3% and that two such chords would reduce the area of a circle by 14.6%. This is one reason that circular shapes are preferred for the perimeters of the curved mirrors and the corrector lenses.

The top view of FIG. 3 illustrates the slight angle of inclination of the first and third respective mirrors and corrector lenses 21, 23 and 41, 43, respectively to the axis of the second central mirror 31 and lens 33. The mirror and lens of the second Schmidt system 31, 33 are generally parallel to the plane of the screen and the axis of cathode ray tube 15, as well as the central axis of mirror 31 and lens 33 is generally orthogonal to the plane of screen. The first and third Schmidt optical systems, on the top and bottom of the second Schmidt optical system in FIG. 3 have cathode ray tubes 13, 17; and mirrors and lenses 21, 23; 41, 43 respectively whose axes are slightly inclined to the axis of the cathode ray tube 15.

The axis of the cathode ray tubes 13, 17 is the common axis of each of the first and third Schmidt optical systems, respectively. In the Schmidt optical systems of the present invention, the angle of inclination between the central axis and the top or bottom axis is a very small angle, less than 4° and preferably about 2.9°. This small angle of inclination creates a very small oblique angle in the images projected by the first and third Schmidt optical systems onto the screen. The small oblique angle on the screen minimizes keystoning and enhances the registration of multiple color images on the screen thereby providing sharp definition of lines of the picture.

FIG. 4 shows an end view of the apparatus of FIG. 3 showing the axial position of the three clustered Schmidt systems.

FIG. 3 also shows the close spacing of abutting edges of adjacent mirrors and lenses. The first and second Schmidt optical systems have abutting mirror edges 22 and 30 and abutting corrector lens edges 26 and 34. The second and third Schmidt optical systems have abutting mirror edges 32, 40 and abutting corrector lens edges 36, 44.

It will be seen that the rear axes of tubes 13, 15, 17 are slightly inclined with respect to each other, as previously explained with respect to FIG. 3.

FIG. 5 shows the positioning of abutting mirrors 21, 31, 41 and their mutually abutting edges 22, 30 and 32, 40. The word "abutting" is intended to include a small space or gap from one mirror or lens to the next. Such a gap may be necessary in mounting of individual components when such components are at slightly different angles with respect to each other. Apertures 28, 38 and 48 are circular holes having centers which coincide with the axes of tubes 13, 15 and 17. These holes provide cooling from behind the mirrors to the side thereof facing the face of a respective cathode ray tube.

In constructing the mirrors and lenses of the present invention, the mirrors may be separate units or unitary structures. For constructing a separate mirror, the mirror may be die cast aluminum with a surface which is ground and polished to the required finish. Also glass, Pyrex or a moldable substrate can be used and then ground and polished to the required finish.

Alternatively, the mirrors may be formed on a single aluminum die casting having a precision finish, to serve as an optical master for a replication process. In this process, reflective coatings are deposited on the master, and then an epoxy layer is placed over the coatings. At that point a substrate having a surface characteristic which matches the master to an approximation is brought into contact with the epoxied layer and allowed to set. When the substrate is separated from the master, the coatings come off with the substrate, leaving the optical master ready for deposition of another coating. It will be noted that the master has a surface complimentary to the mirrors to be formed on the substrate.

The corrector lenses to be used herein may be quartz or glass lenses.

In FIG. 2, three Schmidt optical systems are shown in a left to right side by side configuration. In FIGS. 4 and 5 three Schmidt optical systems are shown in a top to bottom side by side configuration and words such as top, central and bottom have been used to describe the components thereof. It will be realized that neither the number of Schmidt optical systems which are placed side by side is critical nor the left to right or top to bottom alignment is critical. Any number of Schmidt optical systems may be aligned in accord with the present invention and any spatial orientation desired may be used.

I claim:

1. A compact Schmidt optical system for projecting color television pictures from cathode ray tubes onto a screen comprising,
    a plurality of individual Schmidt optical systems adjacently clustered together, each Schmidt optical system comprising, (a) a curved mirror positioned for receiving an image from a respective cathode ray tube and projecting said images toward a screen for common registration with other projected images, and (b) a corrector lens spaced between the curved mirror and the screen, said corrector lens shaped to reduce spherical aberration in said image, each adjacent curved mirror and each adjacent corrector lens having adjacent parallel edges, said edges being chords truncating mirror and lens bodies to permit clustering of adjacent Schmidt optical systems.

2. The apparatus of claim 1 wherein said curved mirrors have a circular shape with spaced, opposed chords truncating said circular shape.

3. The apparatus of claim 1 wherein said corrector lenses have a circular shape with spaced, opposed chords truncating said circular shape.

4. The apparatus of claim 1 wherein adjacent clustered curved mirrors are formed on a single substrate.

5. The apparatus of claim 1 wherein adjacent corrector lenses are formed on a single substrate.

6. The apparatus of claim 1 wherein said curved mirrors and reflector lenses have a circular shape with spaced, opposed chords truncating said circular shape for side-by-side placement of adjacent mirrors and adjacent corrector lenses.

7. The apparatus of claim 6 wherein the number of Schmidt optical systems clustered together is three, with a central system, an upper system and a lower system, said central system having a second axis which is orthogonal to a screen, said upper system and said lower system having respective first and third axes, making acute angles with said second axis of less than 4°.

8. The apparatus of claim 7 wherein said acute angle is approximately 2.9°.

* * * * *